United States Patent

[11] 3,620,319

[72] Inventors: Waldemar Armasow; Helmut Muller; Hans Lindenthal, all of Heidenheim, Germany
[21] Appl. No.: 19,702
[22] Filed: Mar. 16, 1970
[45] Patented: Nov. 16, 1971
[73] Assignee: Voith Getriebe KG Heidenheim, Germany
[32] Priorities: Mar. 14, 1969
[33] Germany
[31] P 19 13 011.1; July 12, 1969, Germany, No. P 19 35 592.1

[54] STEERING DRIVE FOR TRACK-LAYING VEHICLES
1 Claim, 7 Drawing Figs.
[52] U.S. Cl. .................................. 180/6.44, 100/6.7
[51] Int. Cl. .................................. B62d 11/16
[50] Field of Search .................................. 180/6.44, 6.66, 6.7; 74/720.5

[56] References Cited
UNITED STATES PATENTS
| | | | |
|---|---|---|---|
| 3,425,296 | 2/1969 | Livezey | 74/720.5 |
| 3,461,744 | 8/1969 | Booth | 180/6.44 X |
| 3,520,376 | 7/1970 | Muller | 180/6.7 |

Primary Examiner—Benjamin Hersh
Assistant Examiner—Leslie J. Paperner
Attorney—Walter Becker ABSTRACT: A track-laying vehicle has a track on each side with a track-driving member for each track and with an engine driving the track-driving member through respective differential drives, each of which has a control member rotatable in one direction to speed the track-driving members up and in the other direction to slow the track-driving members down. A control arrangement connects the control members for rotation thereof for steering the vehicle. The control arrangement provides for rotation of the control members in respective opposite directions at controlled speed, while the rate at which the control members are rotated is measured and a signal is produced in conformity therewith which is employed for maintaining the speed of adjustment of said control members substantially constant.

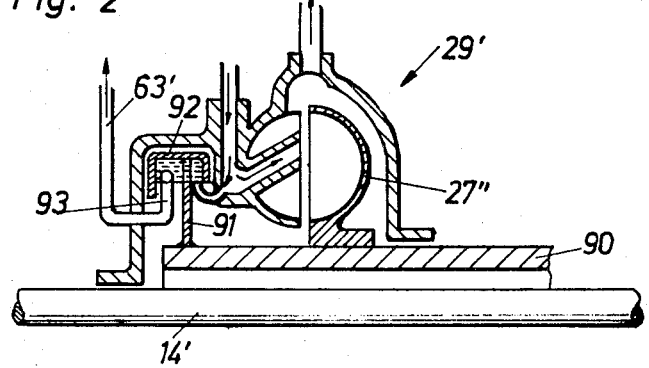
Fig. 2
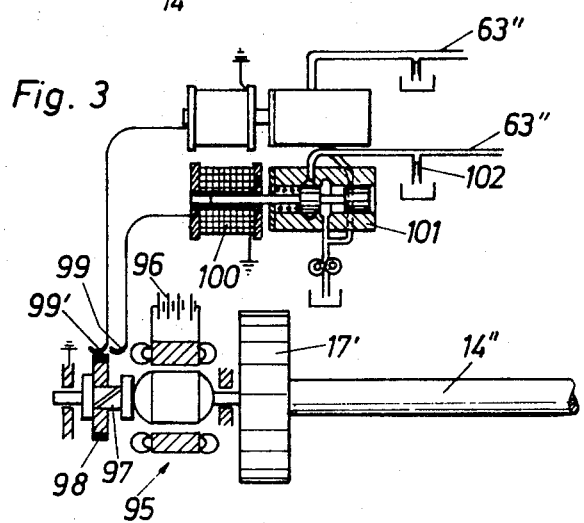
Fig. 3
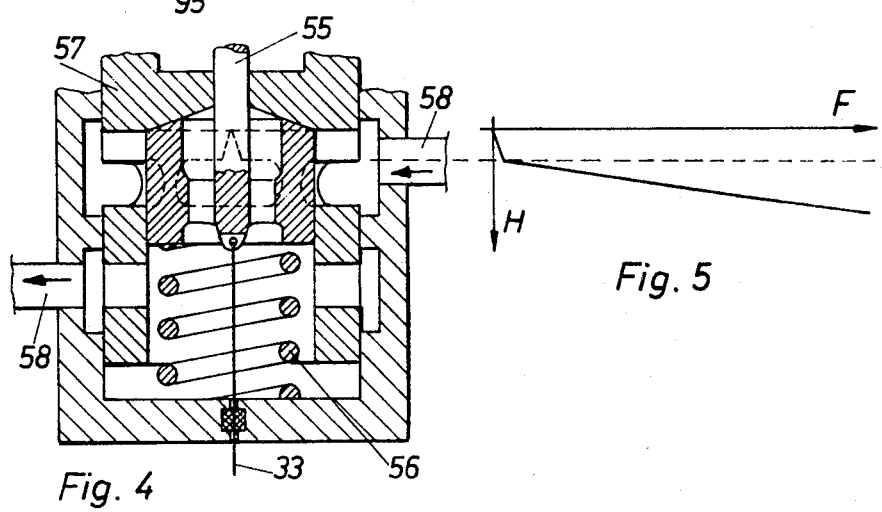
Fig. 4
Fig. 5

STEERING DRIVE FOR TRACK-LAYING VEHICLES

The present invention relates to a track-laying vehicle with both chains driven by a distributing transmission through the intervention of one differential transmission each, the free transmission members of which rest against each other through a supporting shaft which supporting shaft during straightforward drive is at a standstill and when rotating in one or the other direction accelerates the chain in one and retards the same in the other direction. More specifically, the present invention concerns a track-laying vehicle of the above-mentioned type with a steering mechanism which starts from the distributing transmission and is provided with two identical brakes. By means of the said steering mechanism through the intervention of a further differential transmission each, the rotor part of the brakes is driven in such a way that the rotors rotate in a direction opposite to each other while the two free transmission members of the two last-mentioned differential transmissions are fixedly connected to the supporting shaft and rotate the same in the direction of rotation of the respective brake to be engaged. The track-laying vehicle involved in the present case is furthermore provided with a control stick by means of which, depending on the magnitude and the direction of the steering angle, one or the other brake is more or less engaged and consequently the supporting shaft is more or less rotated in one or the other direction. The track-laying vehicle of the present invention is furthermore equipped with a brake lever while the two brakes are designed as hydrodynamic brakes, and the control stick, for the purposes of stabilizing the difference between the speeds of the two track chains in spite of different resistances on said chains is coupled with one filling or pressure control for each brake which control, depending on the angle of the control stick, controls the corresponding brake rotor and thereby the supporting shaft so as to substantially maintain a constant speed.

It is an object of the present invention so to improve a track-laying vehicle of the above-mentioned type which generally is directed to a steering stabilization of differential speed controlled vehicles, that the safety of operation is greatly improved while considerable space and weight will be saved.

To realize the above object, it is suggested according to the invention that with a vehicle of the above mentioned type, the control device which controls the brake rotor speed by controlling the filling comprises a speed indicator driven by the shaft which is to be controlled so as to obtain a constant speed and which produces a signal analogous to the speed and adapted to produce power, said signal serving as measuring means. The said control device furthermore comprises an adjustable relief valve arranged in the outlet of the discharge annular chamber of the brake and throttling the discharge. This relief valve acting as control member is by means of the steering angle adjusted to a certain pressure limit of the speedometer adjusted with increasing speed of the brake motor in closing direction and in response to a decrease in the speed in opening direction.

The speedometer may be provided in various forms. The above-mentioned requirements and the thus described conditions are met by speed-measuring pumps, pressure head indicating pipes which emerge into a liquid ring locating brake rotor, centrifugal power pendulums with a power amplifier and tachogenerators with an electrohydraulic measured value transformer. The speedometer may also be driven from the supporting or zero shaft. In such an instance, however, a measured value deflector has to be provided which guides the forward speed signals to the throttle valve on the other brake.

According to a further development of the present invention, it is suggested that the adjustable relief valve which controls the discharge from the brake has a pair of control edges, which pair of control edges define the throttle opening. Of the two control edges, at least one control edge is movable while the movable control edge is arranged on a first valve member which in its turn is slidably mounted on another valve member which is adjustable by the control lever. Said first valve member is, by means of a spring resting on another valve member, acted upon in opening direction and by a power corresponding to the speed of the brake rotor is on the other hand acted upon in closing direction and is thus held in an equilibrium position relative to the other valve member. It is also advantageous to provide the other adjustable relief valve with two control edges which define the throttle opening and are movable independently of each other toward and away from each other. One of said control edges is adjusted by the control lever in a positive way, whereas the other control edge is controlled by the speedometer.

According to the invention, the control system has been simplified by providing a filling source for the fluid flow brakes which source has an approximately constant delivery, while in the fluid inlet in the brake-work chamber there is provided a shutoff valve. This shutoff valve is actuated by the control lever in a direction counter to the relief valve arranged in the outlet. In order with small steering angles and at low steering resistance (when driving in the street) also to be able to steer with great precision, it is provided according to the invention that the shutoff valve is so designed that within the region of smaller opening strokes it will have a flat course and from a certain stroke on will have a very steep course.

In order also at low driving speeds of the steering mechanism (low motor speeds) to be able to pass along a curve following a circle with short radii, for instance, when driving through streets or in order to be able to turn on the spot, each rotor of the hydraulic dynamic brake is connected to a friction closed hydraulically operable arresting brake. In order to make sure that this brake can be actuated by extremely simple control means, it is furthermore suggested that with the valve member of the control valve actuated by the control wheel, there is coupled a further valve spool which at the end of its distributing range opens a line cross section and through said cross section connects the pressure chamber of the pressing piston of the arresting brake to a source of pressure.

In order not to have too great liquid flows with the control valve, but to allow the construction of a smaller and lighter control valve and in order to do without the corresponding control structure, according to the present invention it is suggested that at the geodetically lowest portion of the brake-discharge ring chamber there is provided a bypass throttle of constant cross section which throttle leads into the pressureless liquid return circuit.

In order that the influence of the speed variations of the steering drive shaft coupled to the motor is, as far as possible, eliminated, and in order to eliminate variations in the curve radius of instantaneous changes of the motor speed (for instance in the converter speed), there is provided a motor control of the control valve in such a way that the output shaft of the motor vehicle drives a speed-measuring pump. Furthermore, on the pair of control edges of the throttle valve, also the second control edge is movable while the said second control edge is acted upon by a spring in closing direction and by a piston receiving fluid from a motor-speed-measuring pump in opening direction. In order to assure during straight forward drive a uniform movement of the track chains in spite of varying roller resistance and without actuation of the controlling device, an arresting brake is provided which is connected to the supporting shaft and is frictionally effective and actuated by hydraulic fluid. For purposes of permitting a corresponding actuation of said arresting brake with a minimum of control means, according to a further development of the invention there is provided a three-way valve which is adjustable by the control lever and only at straight forward position is in rest position while otherwise occupying a working position. This three-way valve when occupying its rest position (straight forward) connects the pressure chamber of the pressure piston of the arresting brake to a source of pressure, and in working position connects the pressure chamber with the pressureless oil return.

The present invention furthermore comprises a track-laying vehicle in which a further filling and/or pressure control device is provided for each brake, which filling and/or pressure control device is coupled to the brake lever of the vehicle while said devices, when braking during straight forward drive at least partially fills both brakes whereas during driving through a curve only the nonused brake is partially filled. According to the present invention, there is provided a two-way valve which is brake pedal actuated and located in the delivery line of a source of filling liquid. There is furthermore provided a reversing valve which is actuated by the control lever and when in its intermediate position conveys actuating fluid pressure to both branching lines and depending on the direction of the steering angle conveys fluid pressure selectively to one of said lines. This reversing valve follows hydraulically the two-way valve directly. One of the two lines which receive fluid selectively depending on the adjusted position of the reversing valve lead into one working chamber each of the brake. More specifically, the line receiving fluid when turning the steering lever toward the left passes into the working chamber of the brake for driving through a right curve, and vice versa. In order to be able to control the thus created braking possibility with regard to its effect in as simple a manner as possible in conformity with the brake pendulum angle, it is provided according to a further development of the invention that in a section of the line between the bypass throttle and the pressureless fluid return, there is provided a variable relief valve which is completely open in its return position and moves into working position only in response to an at random actuation. This pressure relief valve is variable and its spring, which determines the pressure limit, is preloaded to a lesser or greater extent in conformity with the brake lever angle. In view of the arrangement of the speed governor on the steering brakes, the zero shaft will be held at constant speed and thus a constant curve radius will be obtained in spite of varying torque and resistance. This rigid characteristic is reached, however, only above a minimum speed of the brake rotor or above a certain speed of the zero shaft which means below a certain curve radius. Outside this speed and radius range, the brake or governor is yieldable with regard to the speed characteristic as to the speed at torque changes. This means a vehicle of the above-mentioned type is difficult to maintain in its direction when passing through large curves and in particular when straightforward driving, when the ground underneath both track chains is different or when suddenly handicaps such as rocks, slick oil spots or the like are encountered.

It is, therefore, a further object of this invention to overcome the above mentioned drawbacks which means so to supplement the dynamic steering brakes of the track-laying vehicle that also when driving through wide curves or when driving straightforwardly over a terrain which is unfavorable with regard to the steering stability will secure a direction stability of the vehicle without the actuation of the operator or driver. This object has been realized according to the present invention by the fact that with the above mentioned track-laying vehicle, in addition to the zero shaft drive by means of braking power, there is additionally provided a hydrostatic variable and reversible transmission which is designed at a maximum for the steering power requirement at very large radii (zero shaft speeds from zero to $n$ revolutions per minute). This transmission is provided between the steering drive shaft and the zero shaft. Furthermore, means are provided which at least when working within the range of the zero shaft speed below $n$ revolutions per minute in addition to the hydrodynamic zero shaft drive also make effective the hydrostatic transmission in the power flow in such a way that in conformity with the steering angle, the output speed of the hydrostatic transmission is adjusted to the value which corresponds to the desired curve radius.

These and other objects and advantages of the invention will appear more clearly from the following specification in connection with the accompanying drawings, in which:

FIG. 1 diagrammatically illustrates the transmission diagram of a track-laying vehicle with the actuating and control means according to the invention for steering and braking.

FIG. 2 is a static pressure measuring tube employed as speed indicator of the brake rotor.

FIG. 3 shows a tachogenerator employed as speed indicator of the zero shaft with a measuring value switch and an electrohydraulic measured value transformer.

FIG. 4 shows the design of the inlet valve particularly with a soft increase in the inlet cross section in conformity with the valve stroke.

FIG. 5 shows the relationship referred to in FIG. 4, in the form of a diagram.

Figure 1:
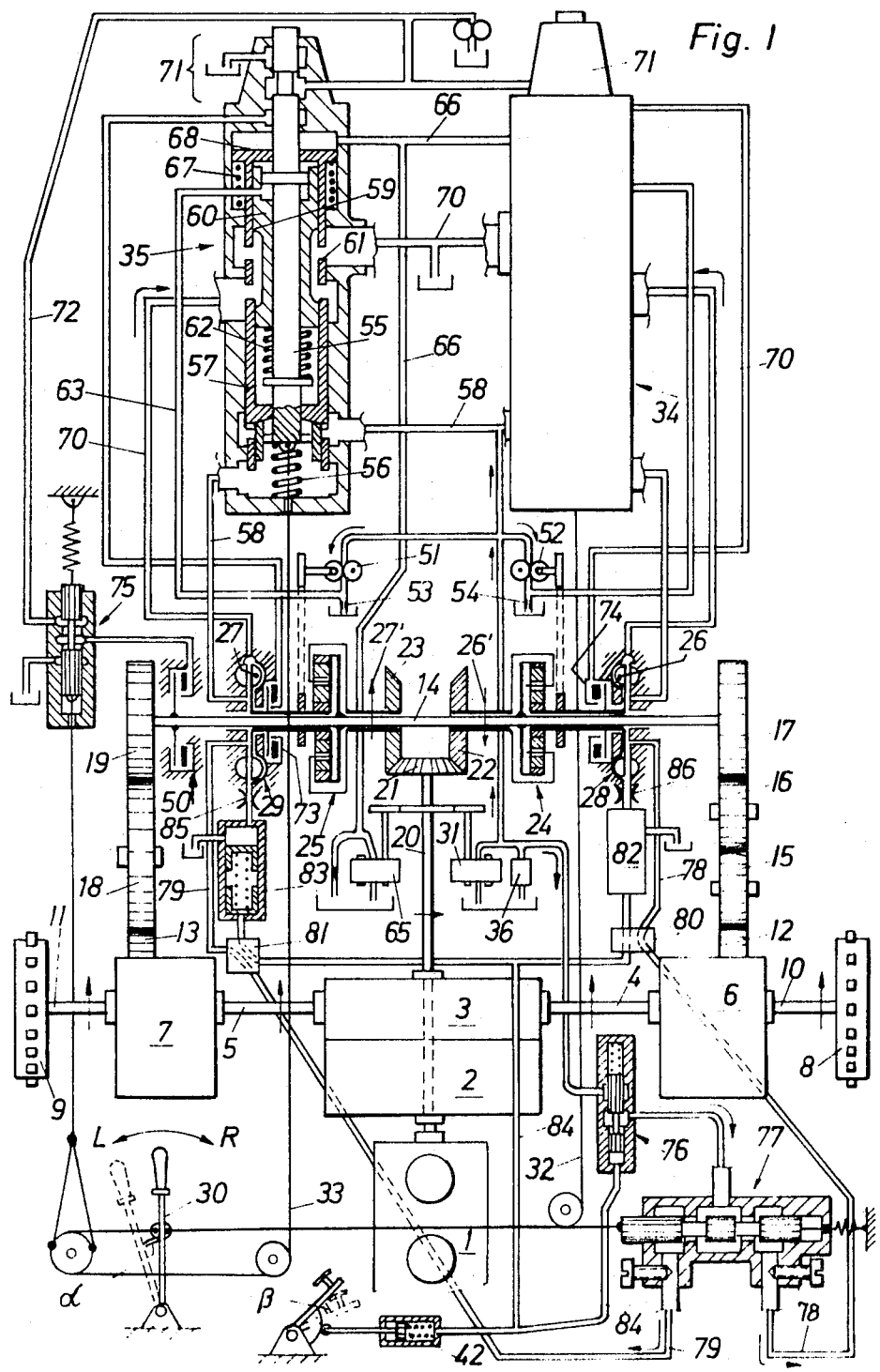

Referring now to the drawings in detail, the driving energy passes from the motor 1 through the control transmission 2 coupled thereto into the distributing drive 3 flanged to the control transmission 2. From here the two shafts 4 and 5 convey the power uniformly distributed over these two strands to the differential transmissions 6 and 7 which are arranged as a form of image to each other. Through said differential transmissions 6 and 7, the shafts 4 and 5 are connected to the main transmission part. The driving axles 10 and 11 which lead to the driving wheels 8 and 9 are respectively connected to the second main transmission part of the differential transmissions 6 and 7. The two third main transmission parts 12 and 13 are rigidly supported with regard to each other through the supporting or zero shaft 14 and gears 15, 16, 17; 18 and 19 which supporting shaft 14 is parallel to the shafts 4 and 5. When the drive is under load, the gears 12 and 13 have the tendency to rotate in the same direction and at the same power. In order to prevent such action, these two gears 12 and 13 are in a manner described above rigidly supported with regard to each other through a reversible drive having a transmission ratio of 1:1. When driving straight forward, i.e. when the two driving wheels 8 and 9 have the same circumferential speed, the supporting shaft is at a standstill inasmuch as the tooth flank pressure on both wheels 12 and 13 is of the same magnitude. In order to be able also to assure a standstill of the supporting shaft when unequal driving resistances are encountered, the zero shaft is provided with a stabilizing brake 50 which is closed only during straightforward drive.

When the supporting shaft 14 is rotated in one direction, the gear 13 is driven in the same direction whereas the gear 12 is at the same speed as gear 13 driven in the opposite direction. As a result thereof, the speed of one driving wheel is increased by a certain amount proportional to the speed of the supporting shaft 14, and the speed of the other driving wheel is reduced by the same amount and is reversed depending on the direction of rotation of the supporting shaft 14. As a result of this speed difference of the driving wheels, the track-laying vehicle will drive through a curve. The higher the speed of the supporting shaft, the higher will be the speed differential of one driving wheel with regard to the other driving wheel and the smaller will be the curve radius. This dependency is linear.

For purposes of creating a speed differential of the track chains, it is necessary to drive the supporting shaft 14. To this end, depending on the condition of the ground and on the curve radius, a more or less considerable proportion of the driving power is necessary. The drive of the supporting shaft 14 is effected from the distributing transmission through the steering drive shaft 20 which rotates at a speed which is proportional to the speed of rotation of the motor 1. The drive shaft 20 through bevel gears 21, 22, 23 and spur gear planetary gear transmissions 24–25 respectively drives the rotor 26 and 27 of the two hydrodynamic brakes 28 and 29. The hollow gears of the planetary gear transmissions 24 and 25 are fixedly connected to the supporting shaft 14. The planetary gear carriers are driven and the output to the braking rotors is effected from the sun gears which rotate in opposite direction with regard to each other as indicated by the arrows 26' and 27'. During straightforward drive, i.e. when the supporting shaft 24 is at a standstill, the brake rotors rotate at the same speed and, more specifically, at a speed which is proportional to a motor speed. This means that also within low velocity ranges at low vehicle speed, the brakes will have a high braking power.

If one of the brakes 28, 29 is engaged, the pertaining sun gear is retarded. The supporting shaft 14 is accelerated from its standstill in proportion to the decrease in the speed of the last-mentioned sun gear, and in conformity with the inner transmission ratio of the planetary gear transmission 24 and, more specifically, in the direction of rotation of the braked rotor (see arrows 26' and 27'). This speed of rotation is superimposed upon the speed of rotation of the driving wheels in such a way that it will be added to the speed of one driving wheel and will be subtracted from the speed of the other driving wheel which means that the vehicle will drive through a curve.

The filling of the brake 28, 29 and thus the driving through a curve is controlled by the control stick 30. Through cable drives 32, 33 a filling control valve 34, 35 may be actuated depending on the direction (left or right) of the angular movement of the control stick (minus or plus $\alpha$). The control valves 34 and 35 adjust the degree of filling of the pertaining brake 28, 29 in such a way that proportional to the angle $\alpha$ of the control stick 30, the speed of the pertaining brake rotor and thereby the speed of the supporting shaft is timewise constant. This speed is in an analogous magnitude conveyed to the control valve 34, 35 by causing the delivery of a volumetric pump 51, 52 driven by the pertaining brake rotor and having a throttle bypass at the pressure side (throttles 53, 54) to act upon a piston surface (piston 60). The piston power is then analogous to the brake rotor speed as far as its magnitude is concerned. The control valves 34 and 35 as well as the speed-measuring pumps 51 and 52 are supplied with working fluid for the hydrodynamic brakes by the filling pump 31 driven by the steering drive shaft 20 which pump is adapted in view of the relief valve 36 to deliver a flow of fluid of a pressure of continuously the same magnitude.

By means of the cable drive 33, 32 and by means of the control lever 30, the central valve member 55 of the control valve 35 is displaced against the thrust of the return spring 56 and opens the pair of control edges arranged in the feeding line 58 and defined by the lower portion of the hollow piston 57 and by a collar-shaped slide of the central valve member 55. The said control edges will in this way, as clearly shown in FIGS. 4 and 5, at small strokes of the valve member 55, due to the notched portion of the control edge on valve member 57 initially free a very small cross section which means that also small filling quantities can in a very sensitive manner be dosed by the steering wheel. Above a certain steering wheel angle, a rapidly increasing filling cross section is adjusted which means that the filling quantity delivered by the filling pump 31 can practically unimpededly flow into the braking chamber.

The central valve member 55 is indirectly provided with a control edge 59 which is directly on the floating piston 60 sliding on the valve member 55. This piston 60 is relative to the central valve member 55 held in a position of equilibrium. This position of equilibrium results from the thrust of the counter spring 62 and the pressure in the pressure chamber of the piston 60. This pressure represents the speed pressure which is indicated by the speed-measuring pump 51 through the measuring line 63. Since also during the straightforward drive the measuring pump operates and consequently a measuring pressure prevails in the pressure chamber of the floating piston 60, piston 60 is always in a lifted position of equilibrium and already slightly blocks the discharge throttle gap 59–61 which is formed by the control edges 59 and 61 and is located in the discharge of the brake (conduit 70). By shifting the control lever 30 toward the right, the valve member 55 is pulled downwardly, the brake inlet is opened and the throttle gap discharge is partly closed. The inflowing quantity of working oil accumulated in the working chamber ahead of the discharge throttle, and a certain brake filling is obtained. A certain degree of filling corresponds to each throttle opening set by the control lever 30, and consequently corresponds to a certain brake rotor speed and thus to a certain speed differential of the track chains. If due to the road or terrain conditions, this differential, i.e. the constant brake rotor speed, is disturbed, the measuring pump 51 conveys a changed pressure which displaces the control edge 59 to a different position of equalibrium and thereby changes the throttle gap in such a way that the speed deviation from the said brake rotor rated speed will again disappear in view of a corresponding change in the degree of filling. When the speed of the supporting shaft 14 decreases in an undesired manner (curve increase) or if the brake rotor speed is increased in an undesired manner, the measuring pump will bring about a decrease in the throttle gap and thus will cause an increase in the degree of filling. The speed deviation at the brake in upward direction is again eliminated. The connection between speed and torque of the steering brakes when illustrated graphically, represents a group of curves which ascend at a steep angle over the ordinate of the diagram which indicates the speed, the parameter of the curves representing the steering angle $\alpha$. Great torque changes within narrow speed ranges are possible. The steepness of the characteristic curves is greatly influenced by the stiffness of spring 62. A soft spring results in a steep characteristic curve, and a hard spring results in a flat characteristic curve.

In order to avoid the necessity of having by means of valves 34, 35 to control the entire fluid flow passing through the steering brakes, which fluid control can be considerable for thermal reasons in order to control the respective output, and in order instead to be able to dimension the control valve 34, 35 smaller than it would correspond to the said fluid flow, only a partial flow is controlled by the valve 34, 35. A considerable part of the fluid flow passes through a bypass throttle 85, 86 of constant cross section into the pressureless oil return, said bypass throttle being located at the geodetically lowest portion of the brake-working chamber. This continuously open throttle simultaneously takes over the function of a customarily controlled low level outlet valve. This function of the valve 82, 83 which is arranged at the lower outlet or bottom discharge will be explained further below.

When the supporting shaft 24 is at a standstill, the brake rotors 26 and 27 are through the bevel gear transmission 21–23 and the planetary gear transmission 24, 25 driven at a speed which is proportional to the motor speed. Inasmuch as when driving in a certain terrain, track-laying vehicles frequently employ a torque converter provided in the control transmission 2, the motor load makes itself felt in a corresponding speed increase of the motor shaft and the steering drive shaft 20. In order to prevent such motor load from causing reactions upon the steering behavior, the discharge throttle gap formed by the pair of control edges 59, 61 is adapted through a motor-speed-measuring pump 65, a corresponding speed measuring conduit 66 and a piston 68, to be controlled from the motor in such a way that with increasing motor speed an increase in the gap and thereby a reduction in the degree of filling will occur. Piston 68 is provided on the axially movable valve member or valve spool which comprises the control edge 61 and is supported by a spring 67.

With extreme steering angles, the valve member 55 in the control valve 34, 35 is displaced to such an extent that the turning on valve 71 which is built together with the control valve 34, 35 opens and that the brake rotor arresting brake 73, 74 is actuated by fluid from the conduit system 72 in which a nearly constant pressure prevails, whereby the supporting shaft 24 is brought to its maximum speed. At lower steering angles, the valve 71 is closed.

A further valve operable by the steering lever 30 is represented by the stabilizing valve 75 which so to speak forms a counterpiece to the valve 71. Valve 75 is a reversible valve which merely when the control valve 30 occupies a position corresponding to the straightforward drive, connects a consumer to the conduit system 72, and when the control valve 30 is shifted into an angular position, disconnects said consumer from the conduit system 72 and establishes communication of the consumer with the return line. By means of the stabilizing valve 75, the frictionally effective arresting or stopping brake 50 which is associated with the supporting shaft 14 is engaged during straightforward drive. In this way a uniform movement or synchronism of the track chains will be assured also when the soil conditions and resistance differ on the right-hand side and the left-hand side.

In view of the constant speed of the steering brakes 28 and 29 brought about by the control device, it is possible to take advantage of the installed brake capacity also for purposes of reducing the driving speed inasmuch as the respectively engaged brake or the pertaining speed governor does not distinguish between a reduction in the speed brought about by an increase in the torque at the supporting shaft 14, which speed decrease is caused by the track chain or by the other brake which is out of use. Consequently, in the brake system of the vehicle there is arranged a precontrol valve 76 actuated by the main brake cylinder 52. This valve 76 will, depending on the brake pedal angle $\beta$, release from the valve pump 31 a more or less great flow of fluid to the brake valve 77. This valve 77 which in its turn is adjusted by the steering lever 30 is so designed that when it occupies a position corresponding to straightforward drive, the two branch conduits 78, 79 are uniformly freed whereas when the steering lever is pivoted toward the left only that conduit is freed which is not used for steering purposes, in other words, the conduit leading toward the left track 29 and vice versa. Depending on the respective brake lever angle $\beta$, there will on the basis of the displacement of the precontrol valve 77 be obtained a more or less high degree of filling in this brake. The brake control valve 77 has each branch line provided with adjusting throttle screws in order to adjust the flow of fluid. The conduits 78 and 79 respectively having interposed therein flow control out-in valves 80, 81, lead to the working chamber of the respective brake 28, 29. These valves 80, 81 are located in a branch line of the brake conduit 84 branching off from the foot brake cylinder 42. When fluid flows in conduit 78, 79, the corresponding flow control valve opens the pertaining brake pressure conduit. This brake pressure conduit acts upon a relief valve 82, 83 with adjustable pressure limit. When the brake pressure line is relieved, this valve located in the lower outlet of the brake-working chamber will offer no flow resistance and thus permits the fluid to discharge unimpededly. With increasing pedal pressure, the throttle piston is first lifted and thereupon the pressure-determining spring is more or less loaded. As a result of this action, it will be appreciated that during the braking operation there will be produced a braking torque for reducing the vehicle speed, this braking torque being produced at the steering brakes and in conformity with the brake pedal stroke $\beta$.

FIG. 2 illustrates a very simple modification of a speed-measuring pump in conformity with the hydrodynamic principle. Together with the rotor 27" of brake 29, connected to the rotor shaft 90, there rotates an annular chamber 92 which is supported by a disc 91 having a perforation at its outer circumference. This annular chamber 92 is continuously kept filled at one side from the brake fluid inlet and emerges into the pressure-drop-measuring pipe 93 connected on the other side to the pressure-measuring line 63'. The pressure building up in the pressure or static tube 93 is a direct measurement for the brake rotor speed.

FIG. 3 illustrates a speed meter which is designed as a tachogenerator 95 and is driven by the zero shaft 14". In the tachogenerator, a uniform magnetic field is excited continuously from a battery 96. The generator creates voltage which is proportional to the zero shaft speed. In order that, depending on the direction of rotation, the measuring voltage can be conveyed to another conductor, the generator shaft has arranged thereon a collector ring 98 which is axially displaceable on a steep thread 97 but is nonrotatably connected thereto. On said collector 98, with regard to ground, the measuring voltage can be withdrawn through a sliding contact 99, 99'. Depending on the direction of rotation, the collector ring 98 occupies another axial position and engages another sliding contact.

The voltage produced by the generator 90 will in one of the magnetic coils 100, depending on the speed of the zero shaft generating more or less strong magnetic field which, depending on the action upon the pistons of the pressure-adjusting valve 101 attracts more or less and consequently will reduce the circuit pressure prevailing in front of the valve 101 to an extent which is analogous to the speed of the zero shaft and will convey said pressure to the measuring conduit 63' leading to the control valves. In view of the throttle 102, a fluid flow will be obtained which will assure the function of the pressure-adjusting valve 101.

Figure 6:
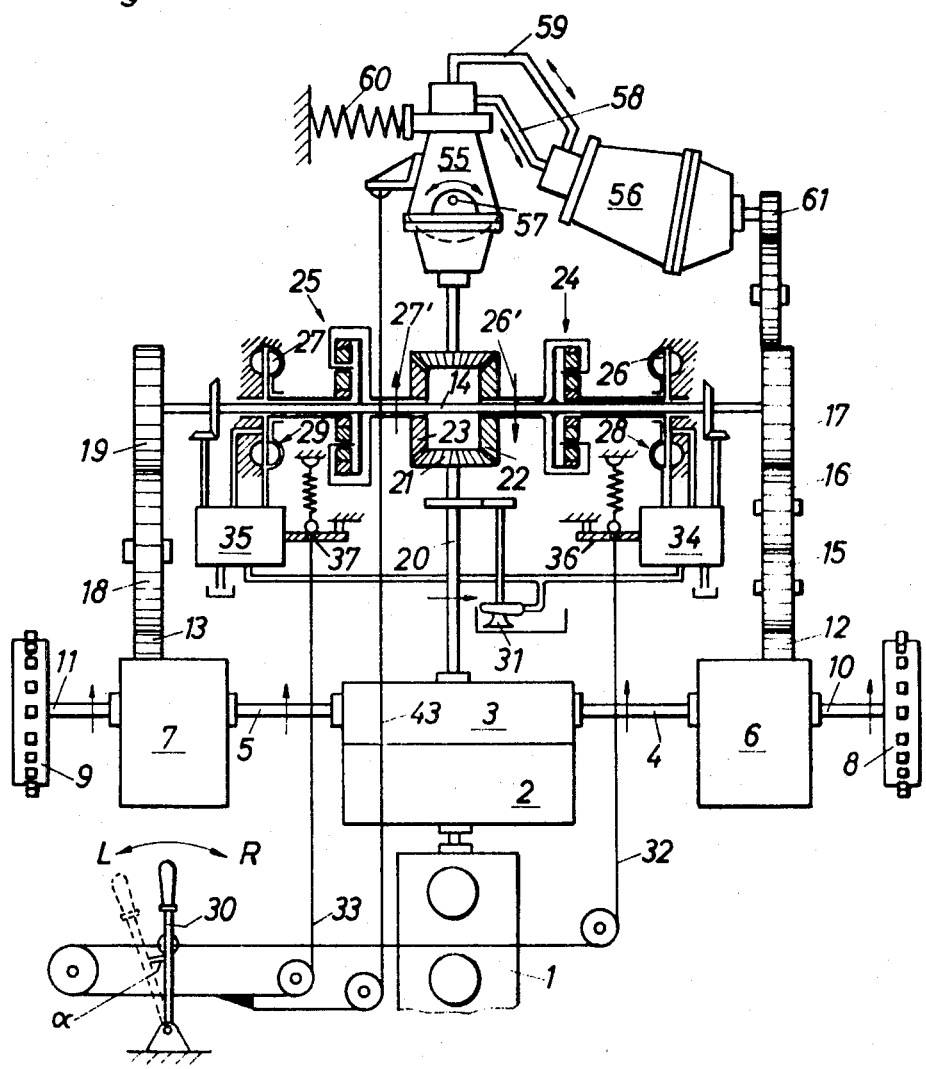
FIG. 6 illustrates the steering transmission of a track-laying vehicle with zero shaft extending all the way through and with a hydrodynamic zero shaft drive by means of a braking force and a hydrostatic additional zero shaft drive when driving through wide curves.

The filling of the brake 28, 29 in the steering transmission according to FIG. 6 and thereby the drive through curves will be controlled by the control stick 30. Through the intervention of cable lines 32, 33, a filling and/or pressure control device 134, 135 is actuated depending on the direction, left or right, of the control stick shifting angle $-\alpha$ or $+\alpha$. The control devices 134 and 135 adjust the degree of filling and/or the pressure in the associated brakes 28, 29 in such a way that proportional to the angle $\alpha$ of the stick 30 or the lever 136, 137, the speed of the supporting shaft 14 is timewise constant. Through a bevel gear transmission, the control devices obtain their control magnitude, the supporting shaft speed. The control devices are supplied with working fluid for the hydrodynamic brakes by the filling pump 31 which is driven by the steering shaft 20.

Figure 7:
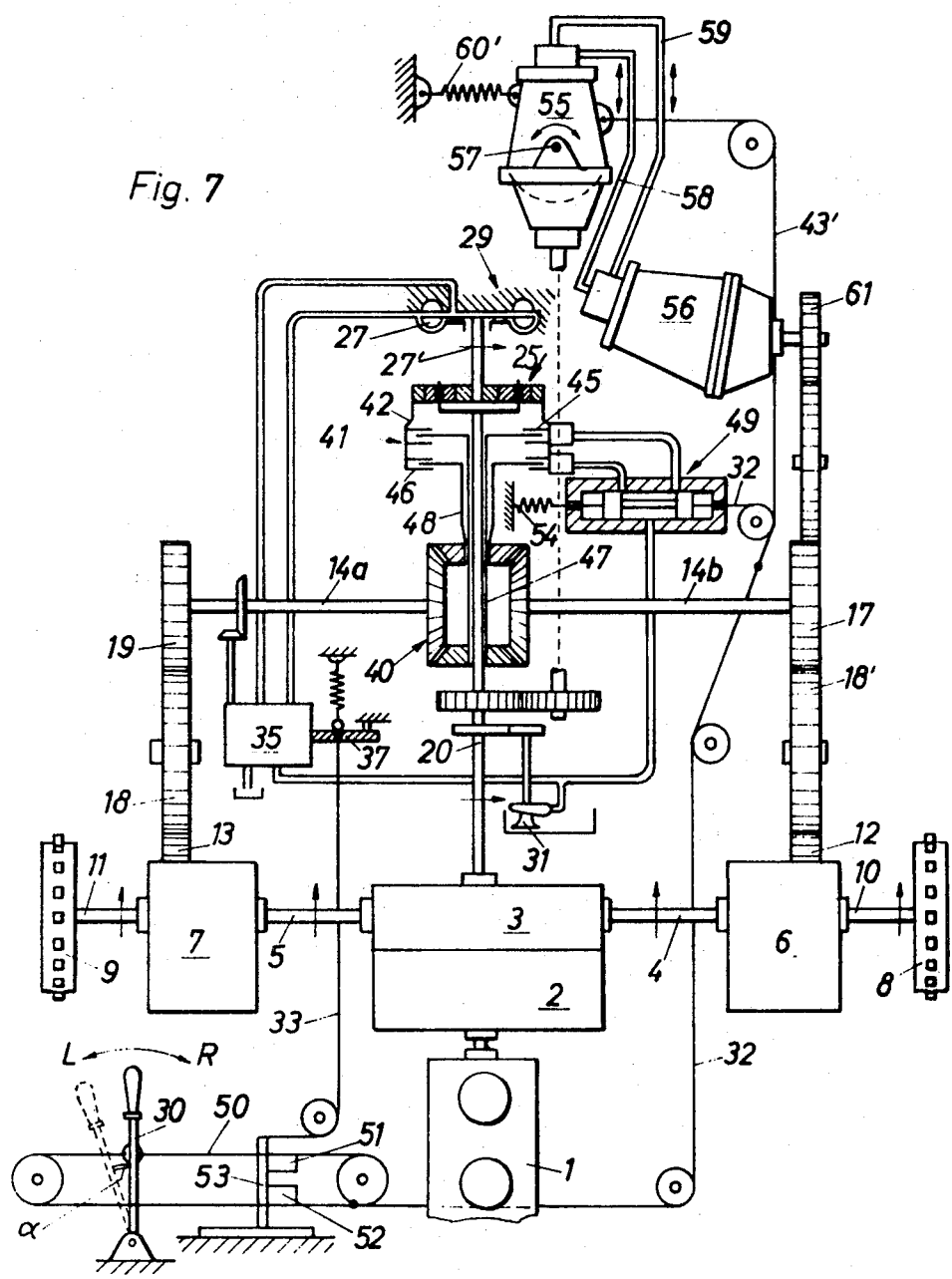
FIG. 7 shows still another steering transmission according to the invention likewise with hydrostatic steering correction but with a zero shaft interrupted by a reversing transmission.

In the steering drive according to FIG. 7, only one hydrodynamic brake 21 and only one heterodyne transmission 25. The transmission 25 is directly driven by the steering shaft 20. The hollow gear of the illustrated planetary gear transmission 25 is fixedly connected to a double clutch 141. In the steering transmission of FIG. 7, the clutch bell is, through a ring 142, connected to the hollow wheel. In view of this arrangement, a monodirection zero shaft is created. This shaft is, when driving through a curve, driven only in one direction and more specifically in the direction of the arrow 27" of the brake rotor 27. The planetary gear carriers are driven from the steering shaft 20, and the output toward the brake rotor 27 is effected from the sun wheel. When straightforward driving, i.e. when the zero shaft is at a standstill, the brake rotor 27 rotates at a speed which is proportional to the motor speed. This means that also within low velocity ranges at low driving speeds, the brake will have a high braking ability.

The double clutch 141 connected to the monodirection zero shaft has two disc clutches 145, 146 which are independent of each other. These clutches are actuated hydraulically and are so designed that they are open when in a pressureless condition and that they are closed when being subjected to pressure. During straightforward drive, i.e. when the steering transmission is at a standstill, those parts of the zero shaft which are not counter to each other are blocked by said double clutch. In the transmission of FIG. 2, two counterrunning shafts 147 and 148 lead outwardly from the reversing drive 140. Connected to said shafts 147 and 148 is one clutch each of the double clutch 141. This steering transmission is adapted at its intermediate transmission 142 and through the double clutch 141 selectively to drive one or the other part of a zero shaft structure with counterrunning parts.

The opening of one of the clutches 145, 146 to be freed and the filling of the brake 29, and thereby the drive through a curve is controlled in the same manner as with the transmission of FIG. 6 by the control stick 30. Through cable lines 33, 32', there is actuated a reversing valve 149 depending on the direction (left or right) of the control stick shifting angle $-\alpha$ or $+\alpha$ and independently of the control lever deviation there is also actuated a single filling and/or pressure control device 135. Provided on the closed cable loop 150 are oppositely located abutments 151 and 152. By means of the said abutments, the follower 153 and thereby the cable line 33 leading to the brake power control device 135 are actuated independently of the direction of the steering lever shaft and in the same manner. The control device 135 will, as with the transmission according to FIG. 6, adjust the degree of filling and/or the pressure in the associated brake 29 in such a way that proportional to the shift angle $\alpha$ of the stick 30 or of the lever 37, the speed of the clutch bell of the double clutch 141 is timewise constant. The control device receives its control magnitude, the speed of the zero shaft, through a bevel gear transmission. The reversing valve 149 is in conformity with the direction actuated by the control lever shift $\alpha$, and more specifically due to the fact that the cable line 32' leading to the reversing valve, unilaterally connected to the closed cable loop 150 which is coupled to the control lever. At the other end on the piston of the reversing valve there is provided a return spring 154. For the sake of simplifying the illustration, the control valve is supplied with pressure oil likewise by the filling pump 31. The pressure oil is for instance by a control lever shift toward R passed only to the clutch 145 and consequently holds only the latter closed, whereas the supply of oil under pressure to the clutch 146 is interrupted so that the clutch is disengaged. As a result thereof, the intermediate shaft 47 is driven through said clutch in the direction of the arrow 27''. In this way, the left driving wheel has positively superimposed an additional circumferential speed, whereas at the other driving wheel 8 there is withdrawn the same amount from the circumferential speed. In this way, a right curve drive will be provided. The operations effected for driving through a left curve are, of course, analogous.

In view of the control characteristic of the speed controlling devices for a timewise constant speed of the pertaining brake rotor, with both so far described embodiments, in spite of varying driving resistances on the track chains, the differential speed of both embodiments and thus the curve radius of the vehicle is constant. This characteristic can, however, be created only above a certain speed of the brake rotors because the necessary changes in the filling below a certain speed with varying moment would be too high in order to maintain a constant speed, i.e. in spite of the speed-controlling devices, the respectively engaged brake (FIG. 6, FIG. 7) are below a minimum speed "too soft." To this end, the hydrodynamic zero shaft drive has by means of the braking power, in conformity with the present invention with both embodiments, arranged in parallel thereto a further steering drive in the form of a controllable hydrostatic transmission 155/156 in the power flow. The hydrostatic transmission consists of an axial pump 155 and an axial piston motor 156 which is reversible in the absorption rotary direction and in the output direction of rotation but is noncontrollable by itself. The connections of the pump or motors for the working media are alternately connected to each other. Inasmuch as the delivery and driving direction of the hydrostatic transmission is reversible, the conduits 158 and 159 do not have a definite direction of flow or a definite high and low pressure.

The adjustable axial piston pump 155 is so connected to the control lever 30 that depending on the degree and direction of the shifting angle $\alpha$ on pump 155, a corresponding delivery direction and quantity will be adjusted. In the transmission according to FIG. 6, this connection is effected by the cable 143 connected to the cable 33. In view of the return spring 160, the tiltable piston part of the pump follows each movement of the cable 143 or control lever 30. Similarly, the control pump is in transmission of FIG. 7 connected to the control lever 30. In this instance, a cable line 43 is suspended on the cable line 32'. In view of the tension spring 160', the bell of pump 155 follows the cable line 143' for each movement of the control stick 30.

When the control stick 30 occupies its intermediate position, also the pivotable piston part of pump 155, the so-called bell occupies its intermediate position in which the pump does not deliver. In this position, the output of the hydrostatic transmission, i.e. the output pinion 161 of motor 156 and thus the zero shaft 14, 14$a$/14$b$ is at a standstill. The driving wheels 8 and 9 rotate at the same speed. When the control stick is pivoted about a small angle $\alpha$, in addition to the levers 137 and 136 in FIG. 6 or lever 107 in FIG. 7, only the bell of the pump 155 is pivoted by a small angle from its intermediate position so that the pump is adjusted for a small quantity of delivery which has to be processed by the motor 156. The motor causes the pinion 161 and thereby the zero shaft 14, 14$a$/14$b$ to rotate slowly. In view of the rigid dependency of the driving speed of motor 156 from the pivot angle of the bell or the pivot angle $\alpha$ of the control lever 30 in view of the volumetric action of the transmission 155/156, the speed of the pinion 161 adjusted by the control lever is also with high variable torques timewise constant at the individual driving gears 8, 9. Inasmuch as wide curves or straight lines are driven through generally at a higher speed, i.e. at a higher motor speed, the input shaft of the hydrostatic transmission 155/156 is, if desired, driven at high speed so that it will be able within the speed range to operate at a very satisfactory volumetric degree of efficiency. Moreover, precisely with small quantities of delivery of pump 155 of the transmission, its torque conversion is particularly high and there exists no danger that the transmission will in view of slight leakage in the motor 156 operate *softly*.

According to the present invention, thus in the illustrated transmissions, a hydrodynamic zero shaft transmission and a purely hydrostatic drive are arranged parallel to each other, said zero shaft drive being approximated by a speed control device to the characteristic of a hydrostatic transmission. These two parallel drives will when steering the track-laying vehicle, which means during the drive of the zero shaft, rotate simultaneously but are effective within different speed ranges. In the lower speed range, only the hydrostatic transmission will be effective, and the hydrodynamic zero drive will idle more or less. Inasmuch as the necessary steering power for steering the track-laying vehicles increases with increasing curvature of a curve more and more, but on the other hand, relatively small when driving through wide curves, it is necessary that the hydrostatic transmission of the pertaining gear transmissions are designed only for low power transmission, at a maximum approximately from 5 to 10 percent of the steering power for turning the track-laying vehicle on the spot. With increasing curve curvature or with increasing speed of rotation of the zero shaft, more and more of the hydrodynamic zero shaft drive becomes effective, and the hydrostatic transmission will be relieved more and more until eventually it rotates merely almost idle together with the hydrodynamic drive. There occurs an automatic low change when driving through the speed spectrum of the zero shaft from one power path to the other.

As will be evident from the above, the advantages of the invention consist in that without much weight- and space-requiring constructions there is provided an infinitely effective and immediately responsive steering correction and direction stabilization for the steering of track-laying vehicles over unfavorable ground condition in wide curves and for straightforward drive.

It is, of course, to be understood that the present invention is, by no means, limited to the particular showing in the drawings, but also comprises any modifications within the scope of the appended claims.

What is claimed is:

1. In a track laying vehicle having a pair of track-driving members, an input shaft, a distributor having a pair of output shafts driven by said input shaft, a differential drive connecting each track-driving member to one of said output shafts, each drive having a control element rotatable in one direction to speed up the pertaining member and in the other direction to slow down the pertaining member, reversible control shaft means interconnecting said control elements for rotation thereof in respectively opposite directions, a steering shaft driven by said input shaft, differential means having input means driven by said steering shaft and output means, drive means connecting said output means with said control shaft means, said differential means having control means and hydrodynamic brake means connected thereto, a steering lever, means responsive to tilting of said lever actuating said hydrodynamic brake means and said drive means to determine the speed and direction of rotation of said control shaft means, and a reversible hydrostatic transmission connecting said steering shaft with said control shaft means, said hydrostatic transmission being connected to said control lever to be adjusted thereby and occupying a neutral position when said control lever is in a neutral position, said hydrostatic transmission being effective for controlling said control shaft means during small steering angles and said hydrodynamic brakes being effective during larger steering angles.

* * * * *